US009945721B2

(12) United States Patent
Abolbashari et al.

(10) Patent No.: US 9,945,721 B2
(45) Date of Patent: *Apr. 17, 2018

(54) SELECTIVE WAVELENGTH IMAGING SYSTEMS AND METHODS

(71) Applicants: Mehrdad Abolbashari, Charlotte, NC (US); Faramarz Farahi, Charlotte, NC (US)

(72) Inventors: Mehrdad Abolbashari, Charlotte, NC (US); Faramarz Farahi, Charlotte, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,109

(22) Filed: Sep. 15, 2015

(65) Prior Publication Data

US 2016/0003675 A1  Jan. 7, 2016

Related U.S. Application Data

(63) Continuation-in-part of application No. 14/219,302, filed on Mar. 19, 2014.

(Continued)

(51) Int. Cl.
| | |
|---|---|
| *G01J 3/12* | (2006.01) |
| *G01J 3/28* | (2006.01) |
| *G02B 27/00* | (2006.01) |
| *H04N 9/04* | (2006.01) |
| *H04N 13/02* | (2006.01) |

(52) U.S. Cl.
CPC ............ *G01J 3/2823* (2013.01); *G01J 3/12* (2013.01); *G02B 27/005* (2013.01); *H04N 9/045* (2013.01); *H04N 13/025* (2013.01); *G01J 2003/1213* (2013.01); *G01J 2003/2826* (2013.01); *H04N 13/0257* (2013.01); *H04N 2209/048* (2013.01)

(58) Field of Classification Search
CPC .. A61K 38/00; A61K 38/1709; A61K 38/395; C07K 14/785; G01J 2003/1213; G01J 2003/2826; G01J 3/12; G01J 3/2823; G02B 27/005; H04N 13/025; H04N 13/0257; H04N 2209/048; H04N 9/045
USPC ........................................................ 356/326
See application file for complete search history.

(56) References Cited

U.S. PATENT DOCUMENTS

| | | |
|---|---|---|
| 5,920,390 A | 7/1999 | Farahi et al. |
| 6,050,656 A | 4/2000 | Farahi et al. |

(Continued)

OTHER PUBLICATIONS

Subbarao et al., Depth from defocus: A spatial domain approach, International Journal of Computer Vision vol. 13, Issue 3, pp. 271-294, Kluwer Academic Publishers.

(Continued)

*Primary Examiner* — Behrooz Senfi
(74) *Attorney, Agent, or Firm* — Clements Bernard Walker PLLC; Christopher L. Bernard

(57) ABSTRACT

The present disclosure provides wavelength discriminating imaging systems and methods that spatially separate (over different depths) the wavelength constituents of an image using a dispersive element or lens, such that this spectral information may be exploited and used. The wavelength constituents of an image are deconstructed and identified over different depths using the dispersive element or lens.

13 Claims, 13 Drawing Sheets

Related U.S. Application Data

(60) Provisional application No. 61/837,440, filed on Jun. 20, 2013, provisional application No. 62/050,499, filed on Sep. 15, 2014.

(56) References Cited

U.S. PATENT DOCUMENTS

| | | | |
|---|---|---|---|
| 6,191,894 B1* | 2/2001 | Kitamura | G02B 15/173 359/676 |
| 6,980,710 B2 | 12/2005 | Farahi et al. | |
| 7,058,245 B2 | 6/2006 | Farahi | |
| 7,067,240 B2 | 6/2006 | Farahi et al. | |
| 7,126,976 B2 | 10/2006 | Farahi et al. | |
| 8,463,092 B2 | 6/2013 | Farahi | |
| 2003/0203524 A1 | 10/2003 | Farahi et al. | |
| 2010/0019170 A1* | 1/2010 | Hart | A61B 1/043 250/459.1 |
| 2011/0206291 A1* | 8/2011 | Kashani | A61B 3/12 382/255 |
| 2011/0232211 A1 | 9/2011 | Farahi | |
| 2011/0285995 A1* | 11/2011 | Tkaczyk | G01J 3/02 356/326 |
| 2013/0340543 A1 | 12/2013 | Farahi et al. | |
| 2014/0000704 A1 | 1/2014 | Farahi | |
| 2014/0037209 A1* | 2/2014 | Robinson | G06K 9/6232 382/170 |
| 2014/0085622 A1* | 3/2014 | Wong | G01J 3/0278 356/5.04 |
| 2014/0176592 A1* | 6/2014 | Wilburn | H04N 5/23212 345/589 |
| 2014/0241633 A1* | 8/2014 | Flanders | G06K 9/0063 382/191 |
| 2014/0340570 A1* | 11/2014 | Meyers | H04N 5/211 348/370 |

OTHER PUBLICATIONS

Lertrusdachakul, A Novel 3D recovery method by dynamic (de)focused projection, Nov. 30, 2011, Ecole Doctorale Environnement—Sant'e / STIC (E2S).

Favaro et al., A Theory of Defocus via Fourier Analysis, Proc. of IEEE Conf. on Computer Vision and Pattern Recognition (2008).

Ng et al., Light Field Photography with a Hand-held Plenoptic Camera, Stanford Tech Report CTSR Feb. 2005.

Adelson et al., Single Lens Stereo with a Plenoptic Camera, IEEE Transactions on Pattern Analysis and Machine Intelligence, vol. 14, No. 2, Feb. 1992.

* cited by examiner

SELECTIVE WAVELENGTH IMAGING SYSTEMS AND METHODS

CROSS-REFERENCE TO RELATED APPLICATION

The present patent application/patent is a continuation-in-part (CIP) of co-pending U.S. patent application Ser. No. 14/219,302, filed on Mar. 19, 2014, and entitled "WAVELENGTH DISCRIMINATING IMAGING SYSTEMS AND METHODS," which claims the benefit of priority of U.S. Provisional Patent Application No. 61/837,440, filed on Jun. 20, 2013, and entitled "WAVELENGTH DISCRIMINATING IMAGING SYSTEMS," the contents of both of which are incorporated in full by reference herein. The present patent application/patent also claims the benefit of priority of co-pending U.S. Provisional Patent Application No. 62/050,499, filed on Sep. 15, 2014, and entitled "SELECTIVE WAVELENGTH IMAGING SYSTEMS AND METHODS," the contents of which are incorporated in full by reference herein.

FIELD OF THE DISCLOSURE

The present disclosure relates generally to the optics and imaging fields. More specifically, the present disclosure relates to wavelength discriminating imaging systems and methods that spatially separate the wavelength constituents of an object/scene imaged using a dispersive lens element or system, such that this spectral information may be exploited and used. In other words, the wavelength constituents of the object/scene imaged are deconstructed and identified over different depths using the dispersive lens element or system.

BACKGROUND OF THE DISCLOSURE

In general, spectral imaging is a technique used to image an object or scene at different wavelengths. There are different spectral imaging techniques, including multispectral imaging (imaging at specific wavelengths), hyperspectral imaging (imaging at many wavelengths), and full spectral imaging (acquiring data as a spectral curve). The proposed spectral imaging techniques use a modified form of a conventional imaging system (e.g. a camera), by adding a special lens or other accessory to the conventional imaging system.

The basics of the proposed spectral imaging techniques are based on the use of a dispersive lens element or system and depth measurement. By using a dispersive lens element or system, one can convert the wavelength constituents of an object or scene into depth information, and then use depth measurement techniques to measure the depth information, which provides a representation of the wavelength constituents of the object or scene. The proposed spectral imaging techniques have significant advantages over conventional selective filtering and point-by-point spectroscopy techniques, for example. In addition, the present disclosure provides a method for using a direct conventional image (monochromatic or multicolored, such as red-green-blue (RGB)) of an object or scene and a spectral imaging system to improve spatial and wavelength resolution, and to reduce or eliminate unwanted aberrations, as well as increase confidence levels (i.e. reduce error rates).

BRIEF SUMMARY OF THE DISCLOSURE

Again, in various exemplary embodiments, the present disclosure provides wavelength discriminating imaging systems and methods that spatially separate the wavelength constituents of an object/scene using a dispersive lens element or system, such that this spectral information may be exploited and used. In other words, the wavelength constituents of the object/scene are deconstructed and identified over different depths using the dispersive lens element or system. In addition, the present disclosure provides a method for using a direct conventional image (monochromatic or multicolored, such as RGB) of an object or scene and a spectral imaging system to improve spatial and wavelength resolution, and to reduce or eliminate unwanted aberrations, as well as increase confidence levels (i.e. reduce error rates).

In one exemplary embodiment, the present disclosure provides a spectral imaging system, comprising: a dispersive element operable for separating wavelengths associated with an image by distance; and a sensor operable for determining a given wavelength from the separated wavelengths using the distance. Optionally, the dispersive element comprises a lens and a dispersive medium. Optionally, the dispersive medium is a dispersive lens. Optionally, the dispersive element comprises a plurality of lenses separated by a dispersive medium. Optionally, the spectral imaging system also comprises a camera or a light field camera. Optionally, the spectral imaging system further comprises a conventional imaging system. Optionally, the spectral imaging system still further comprises a confocal system. Optionally, the spectral imaging system still further comprises a microlens array. Optionally, the spectral imaging system still further comprises a lens array having varying focal lengths. Optionally, the spectral imaging system still further comprises a lens array having varying displacement with respect to a lens array plane. Optionally, the spectral imaging system still further comprises a lens and one or more beamsplitters operable for dividing a beam from the lens into a plurality of beams. Optionally, the spectral imaging system still further comprises one or more filters operable for separating wavelengths. Optionally, the spectral imaging system still further comprises a profilometry algorithm operable for acquiring both depth and spectral information. Optionally, the spectral imaging system still further comprises one or more of a faceplate and a flexible fiber bundle operable for converting a three-dimensional image into a two-dimensional image.

In another exemplary embodiment, the present disclosure provides a spectral imaging method, comprising: providing a dispersive element operable for separating wavelengths associated with an image by distance; and providing a sensor operable for determining a given wavelength from the separated wavelengths using the distance. Optionally, the dispersive element comprises a lens and a dispersive medium. Optionally, the dispersive medium is a dispersive lens. Optionally, the dispersive element comprises a plurality of lenses separated by a dispersive medium. Optionally, the spectral imaging method also comprises providing a camera or a light field camera. Optionally, the spectral imaging method further comprises providing a conventional imaging system. Optionally, the spectral imaging method still further comprises providing a confocal system. Optionally, the spectral imaging method still further comprises providing a microlens array. Optionally, the spectral imaging method still further comprises providing a lens array having varying focal lengths. Optionally, the spectral imaging method still further comprises providing a lens array having varying displacement with respect to a lens array plane. Optionally, the spectral imaging method still further comprises providing a lens and one or more beamsplitters operable for dividing a beam from the lens into a plurality of beams. Optionally, the spectral imaging method still further comprises providing one or more filters operable for separating wavelengths. Optionally, the spectral imaging method still further comprises providing a profilometry algorithm operable for acquiring both depth and spectral information. Optionally, the spectral imaging method still further comprises providing one or more of a faceplate and a flexible fiber bundle operable for converting a three-dimensional image into a two-dimensional image.

In a further exemplary embodiment, the present disclosure provides a spectral imaging system, comprising: a dispersive element operable for separating wavelengths associated with an image by distance; and a sensor operable for determining a given wavelength from the separated wavelengths using the distance. Optionally, the dispersive element comprises a lens and a dispersive medium. Optionally, the dispersive medium is a dispersive lens. Optionally, the dispersive element comprises a plurality of lenses separated by a dispersive medium. Optionally, the spectral imaging system also comprises a camera or a light field camera. Optionally, the spectral imaging system further comprises a conventional imaging system. Optionally, the spectral imaging system still further comprises a confocal system. Optionally, the spectral imaging system still further comprises a microlens array. Optionally, the spectral imaging system still further comprises a lens array having varying focal lengths. Optionally, the spectral imaging system still further comprises a lens array having varying displacement with respect to a lens array plane. Optionally, the spectral imaging system still further comprises a lens and one or more beamsplitters operable for dividing a beam from the lens into a plurality of beams. Optionally, the spectral imaging system still further comprises one or more filters operable for separating wavelengths. Optionally, the spectral imaging system still further comprises a profilometry algorithm operable for acquiring both depth and spectral information. Optionally, the spectral imaging system still further comprises one or more of a faceplate and a flexible fiber bundle operable for converting a three-dimensional image into a two-dimensional image. Optionally, the spectral imaging system still further comprises a spatial mask having a variable thickness. Each pixel or group of pixels of the spatial mask has a predetermined thickness such that the optical distance of each pixel or group of pixels from the dispersive element is determined, in part, by the predetermined thickness of each pixel or group of pixels. Optionally, the spatial mask comprises a plurality of substantially planar surfaces. Alternatively, the spatial mask comprises a substantially curved surface.

BRIEF DESCRIPTION OF THE DRAWINGS

The present invention is illustrated and described herein with reference to the various drawings, in which like reference numbers are used to denote like system components/ method steps, as appropriate, and in which.

DETAILED DESCRIPTION OF THE DISCLOSURE

Figure 1:
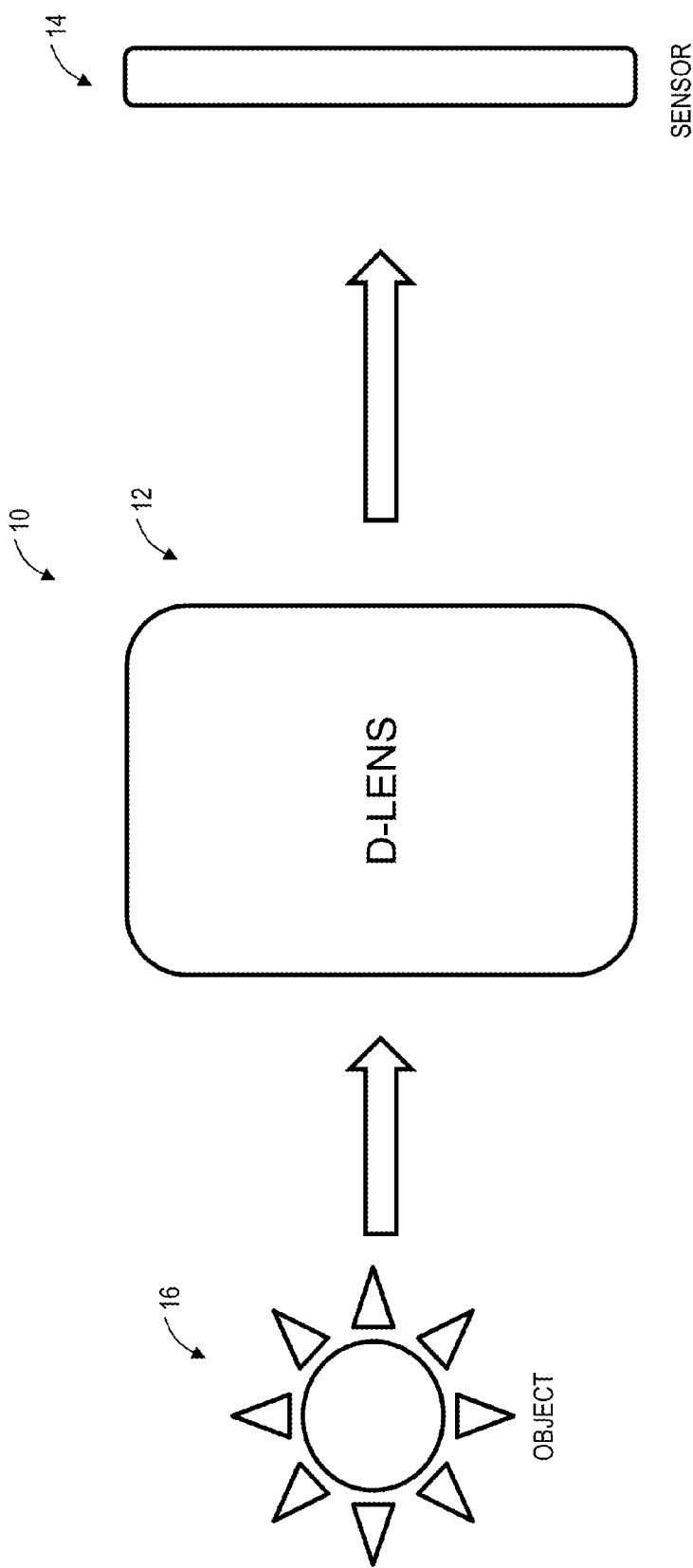
FIG. 1 is a schematic diagram illustrating one exemplary embodiment of the spectral imaging system of the present invention.

Referring now specifically to FIG. 1, in one exemplary embodiment, the spectral imaging system 10 of the present disclosure is similar to a conventional camera, except for the lens. The conventional lens is replaced with a lens that consists of a dispersive element, a combination of lenses, a combination of dispersive elements, a dispersive element and a lens, or a dispersive material (collectively referred to herein as the "dispersive element," the "dispersive lens," or the "D-lens"). Since the D-lens 12 has dispersive properties (i.e. different wavelengths have different refractive indices, which results, for example, in different focal lengths) it produces an image on the sensor 14 that is sharp (i.e. in focus) for some wavelengths and blurred (i.e. out of focus) for other wavelengths. By taking N different images of an object 16 with different camera parameters and using conventional depth measurement techniques and algorithms, one can calculate the image at each specific wavelength.

There are different conventional methods to measure the volume of an object and recover depth. Depth from focus (DFF), depth from defocus (DFD), and light field photography are three examples of depth measurement techniques. In the DFF technique, several images are taken using different camera parameters. The images are focused (usually locally), and by analyzing these focused images, the depth information is calculated. This technique requires a plurality of images, fine measurement of the camera parameters, and accurate focus measurement. In the DFD technique, several images are taken using different camera parameters. The images can be as few as two and do not need to be in focus. To accurately recover depth information, the camera should be calibrated to extract the parameters of the camera and an accurate model is needed for blurring effects where the image is out of focus. In the light field photography technique, a light field is recorded and then processed to reconstruct the desired image. One problem that may be addressed using light field photography is refocusing; a light field image can be taken first and then refocused later. This technique has the potential to reconstruct several focused or blurred images from the captured light field. Thus, using this technique, one can synthesize several focused or defocused images after acquiring a light field and then analyze those images to recover depth information.

All of the above-mentioned depth measurement techniques are based on the fact that different points of the object/scene, that have different depths, have either different focus distances or different blurring radii (i.e. the radius of the circle of confusion). Given a two-dimensional (2-D) object/scene that has different wavelength content in different locations of the object, by using a D-lens, each point has a focus distance or blurring radius that depends on the wavelength content of that point of the object/scene and a dispersion property of the D-lens. Therefore, the wavelength content of the object/scene is encoded with the focus distance or blurring radius. Since this is equivalent to the problem of depth measurement, in which the depth information is encoded in the focus distance or blurring radius, one can use the same techniques to recover the wavelength content of the object/scene. In other words, the wavelength content of the object/scene is equivalent to the depth information that can be recovered using the various techniques described above. FIG. 1 illustrates spectral imaging using DFF or DFD techniques and FIG. 2 illustrates one possible implementation using a light field photography technique.

Figure 2:
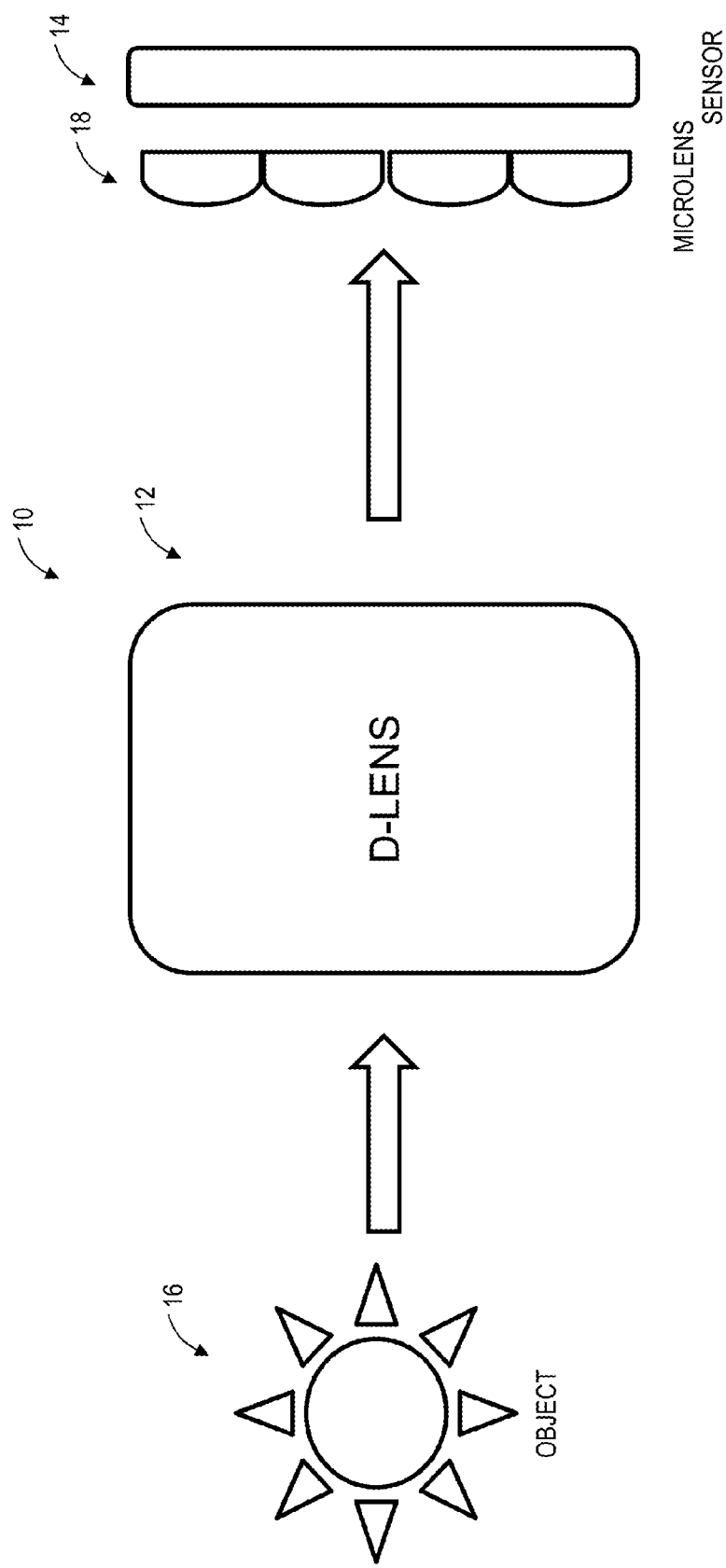
FIG. 2 is a schematic diagram illustrating another exemplary embodiment of the spectral imaging system of the present invention.

Referring now specifically to FIG. 2, in another exemplary embodiment, the spectral imaging system 10 includes a main lens 12, a microlens array 18, and a photosensor array 14. If the main lens 12 is replaced by a D-lens 12, then different wavelengths are focused at different distances from the D-lens 12. By knowing the dispersion properties of the D-lens 12 and the camera parameters, depth (i.e. wavelength) information may be extracted.

Figure 3:
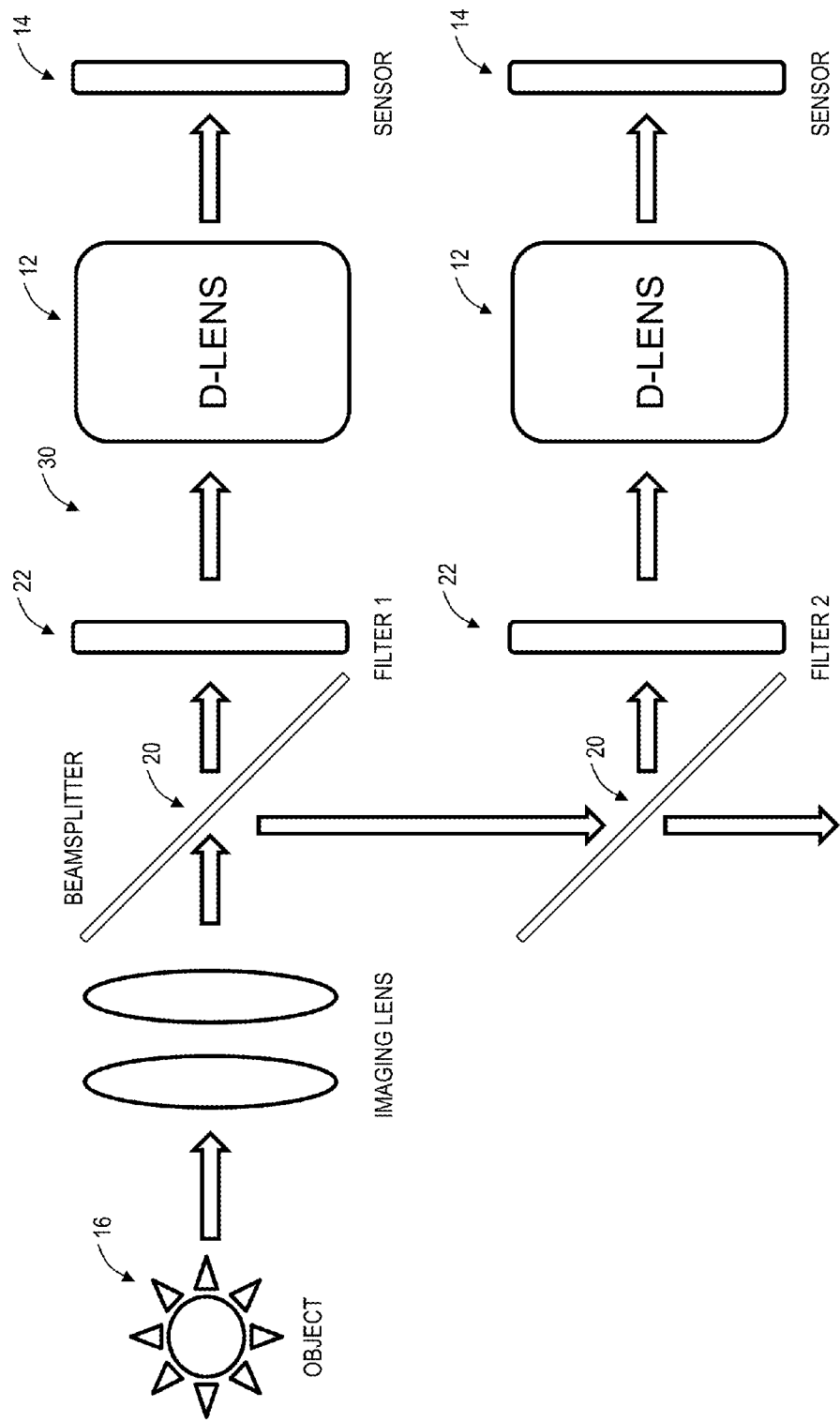
FIG. 3 is a schematic diagram illustrating a further exemplary embodiment of the spectral imaging system of the present invention incorporating a plurality of beamsplitters.

The following are exemplary configurations of the wavelength discriminating imaging system of the present invention. In FIG. 3, the object/scene 16 is imaged and divided into multiple beams using beamsplitters 20. Each divided light beam is filtered 22 to represent a specific wavelength band. The output of each filter 22 is analyzed using the proposed spectral wavelength discriminating system to calculate the spectral images. This spectral imaging system 30 can be combined with a three-dimensional (3-D) imaging system 32 to acquire both spectral and spatial information. The 3-D imaging system 32 can be any 3-D imaging system, including an imaging system using depth from focus, depth from defocus, or light field photography techniques to calculate the 3-D image (see FIG. 4).

Figure 4:
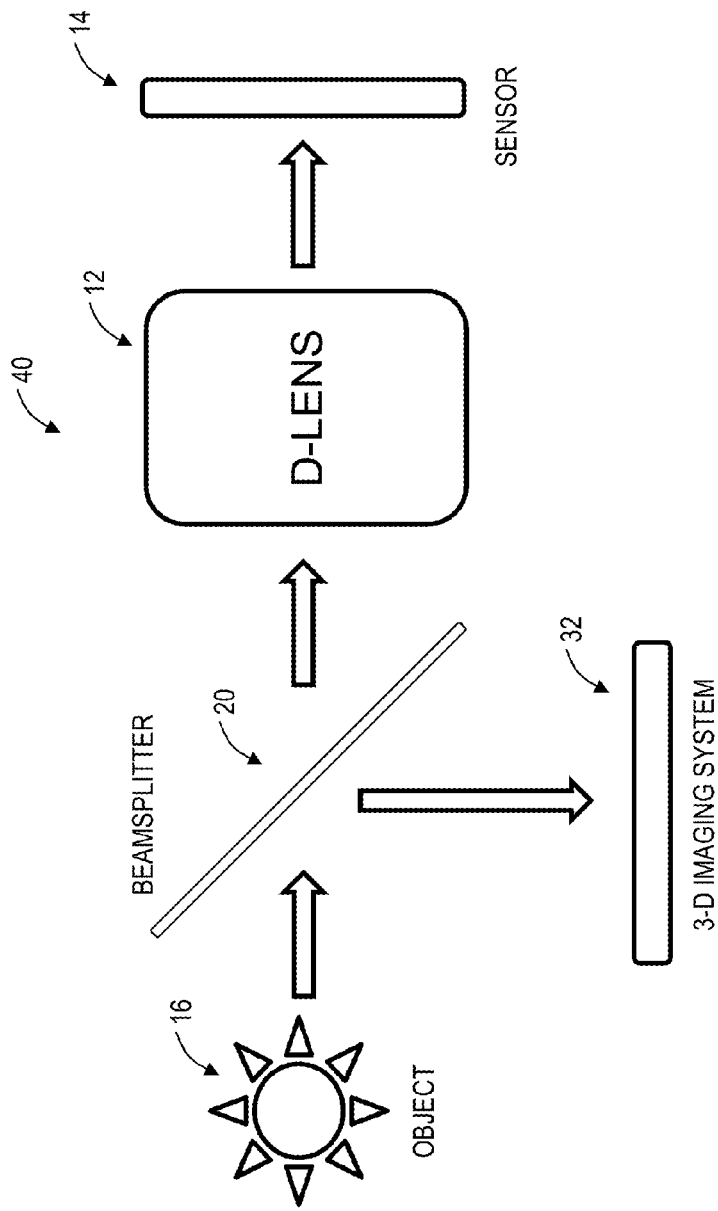
FIG. 4 is a schematic diagram illustrating a still further exemplary embodiment of the spectral imaging system of the present invention incorporating a beamsplitter and a 3-D imaging system.
Figure 5:
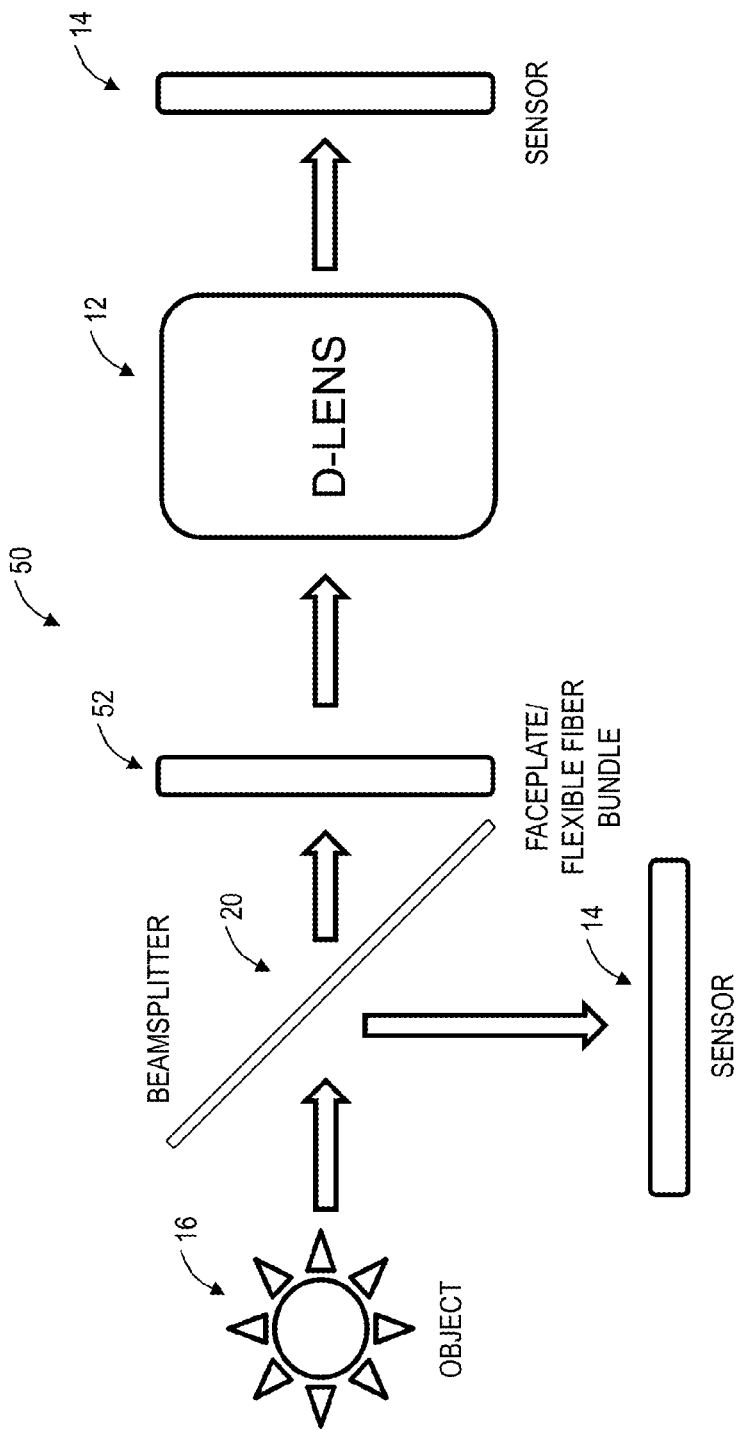
FIG. 5 is a schematic diagram illustrating a still further exemplary embodiment of the spectral imaging system of the present invention incorporating a faceplate/flexible fiber bundle.
Figure 6:
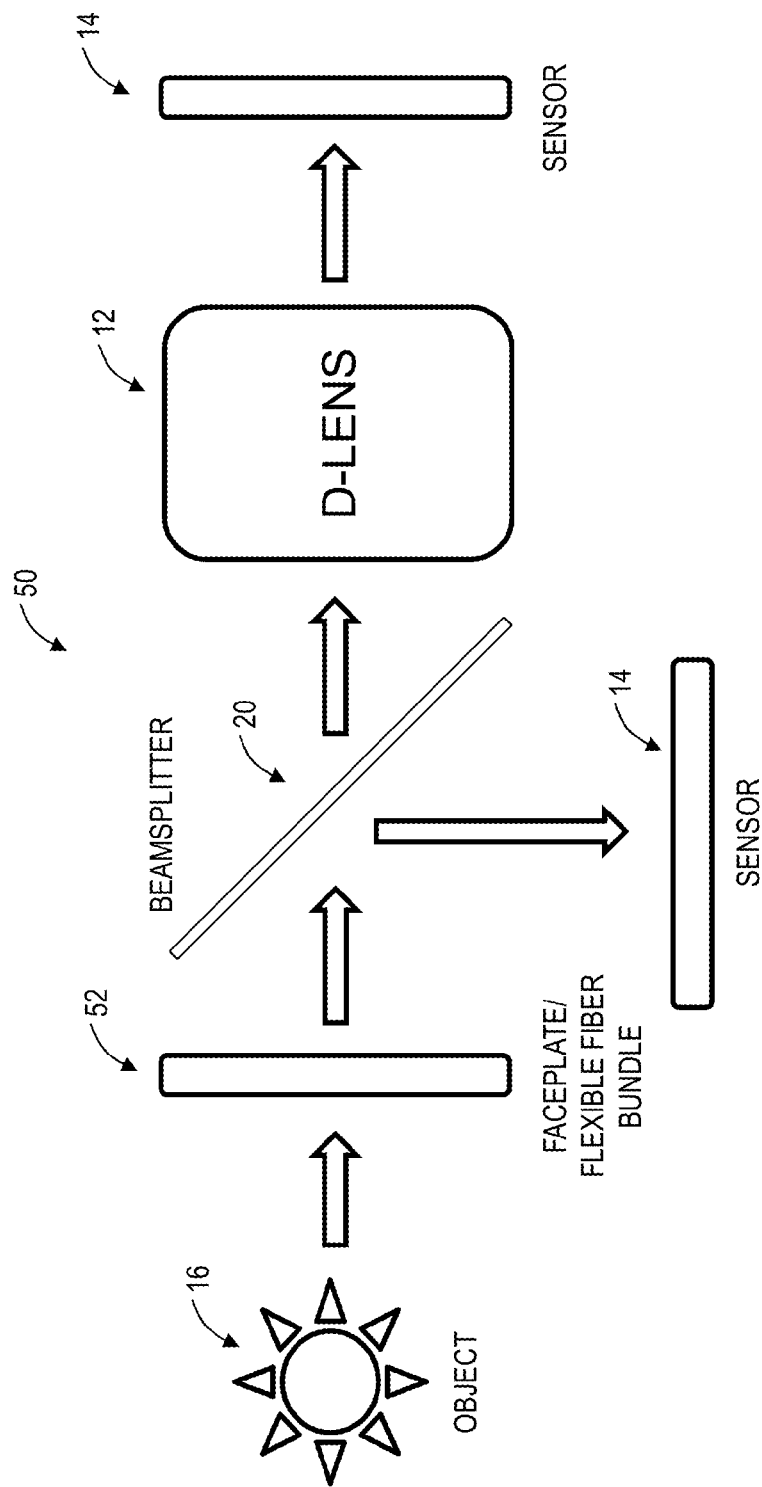
FIG. 6 is a schematic diagram illustrating a still further exemplary embodiment of the spectral imaging system of the present invention incorporating a faceplate/flexible fiber bundle.

FIG. 4 illustrates a combination spectral and 3-D imaging system 40 to acquire both the spectral and spatial information. The three-dimensional object/scene 16 can be converted into a two-dimensional image by imaging the object/scene 16 onto a plane. Converting a 3-D object/scene 16 into a 2-D image eliminates any confusion between the depth information that results from a 3-D object/scene 16 and the depth information that is a result of the dispersion. Converting a 3-D object/scene 16 into a 2-D image is realized by using a faceplate or flexible fiber bundle 52. The captured image then is fed into the spectral imaging system 50 to extract the spectral information. This is illustrated in FIGS. 5 and 6. The configuration explained previously can be combined with 3-D imaging to acquire both spectral and spatial information. The element that converts the 3-D object/scene 16 into a 2-D image (e.g. the faceplate or a flexible fiber bundle 52) can be placed before or after the beamsplitter 20. Another possibility is to integrate the beamsplitter 20 into the faceplate or the flexible fiber bundle 52. The faceplate or the flexible fiber bundle 52 utilizes a numerical aperture equal to or less than one (1), and optimal numerical aperture may be utilized to harvest more power.

The spectral imaging system can be improved using an auxiliary 2D or 3D imaging system. The improvement can be, but is not limited to, in the reduction or elimination of unwanted aberration, increasing the spatial resolution of spectral images, and/or increasing the spectral resolution of spectral images. The auxiliary 2D or 3D imaging system can be integrated into the spectral imaging system, e.g. by the means of a beamsplitter. The 2D or 3D imaging system can be grayscale or color (e.g. RGB color) images.

Figure 9:
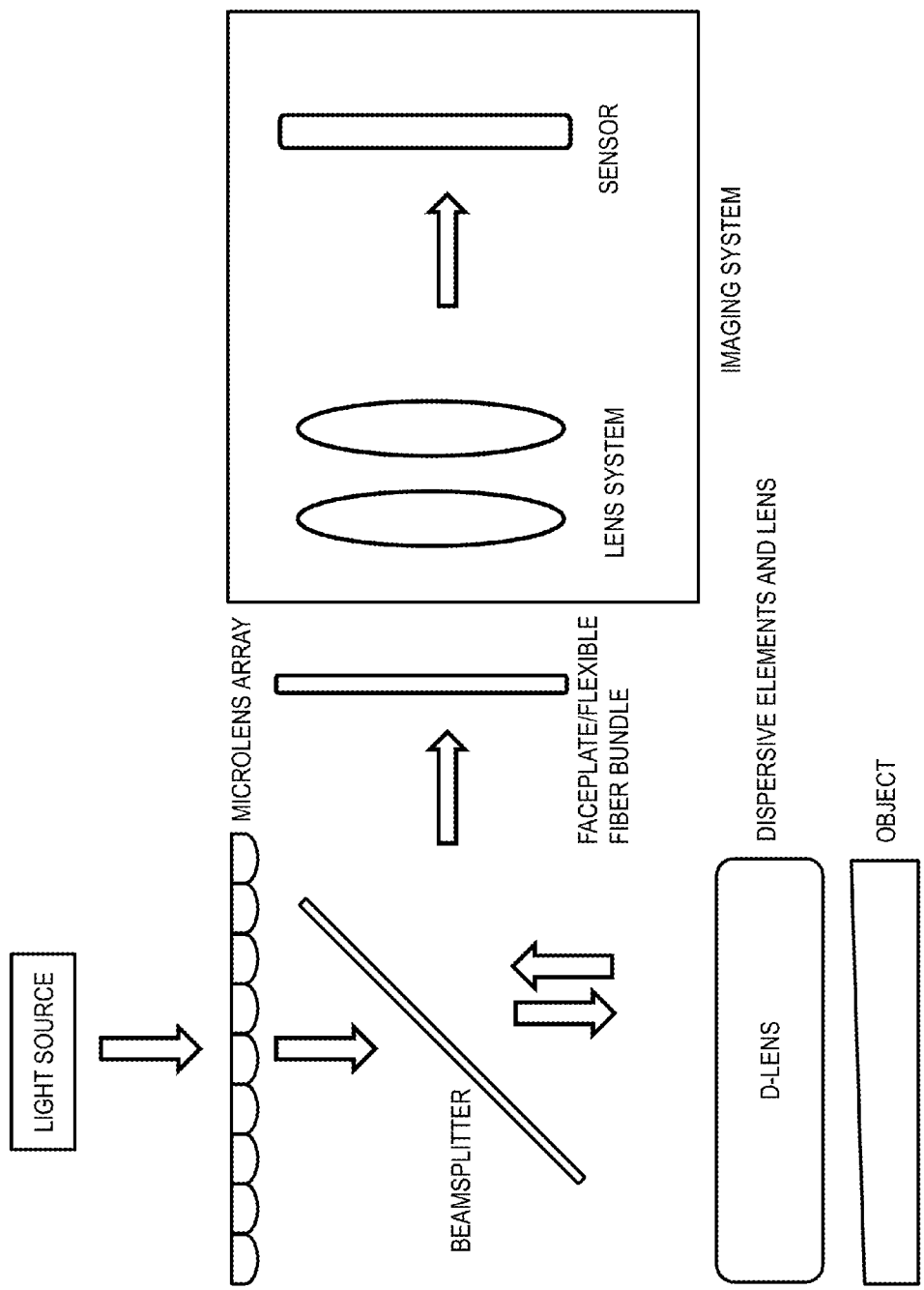
FIG. 9 is a schematic diagram illustrating a still further exemplary embodiment of the spectral imaging system of the present invention.

The following are exemplary configurations of the confocal imaging system of the present invention. In FIG. 9, the light is divided into an array of lights by passing through a microlens array. Divided lights pass through a pinhole array, which is placed at the focal plane of microlens array. Then divided lights pass through a D-lens, which results in focusing each wavelength at a specific distance; therefore the whole or partial sectioning of the object is done without any movement in vertical direction. The imaging system then images the reflected/scattered back intensity from object to calculate the profile of the object.

When the system light source is a while light or a broadband light source, the imaging system needs to be a spectral imaging system to separate different wavelengths, which can be one of the spectral imaging systems explained in the present invention. When the light source is tunable laser source or diode lasers which are turned ON in sequence, the spectral imaging system is not needed and the imaging system may be a lens system and a sensor array responsive to the corresponding wavelengths. When the light source is combined of three red, green, and blue wavelengths, the three wavelengths may be turned ON simultaneously and an RGB camera with a lens system may be used as imaging system.

Figure 10:
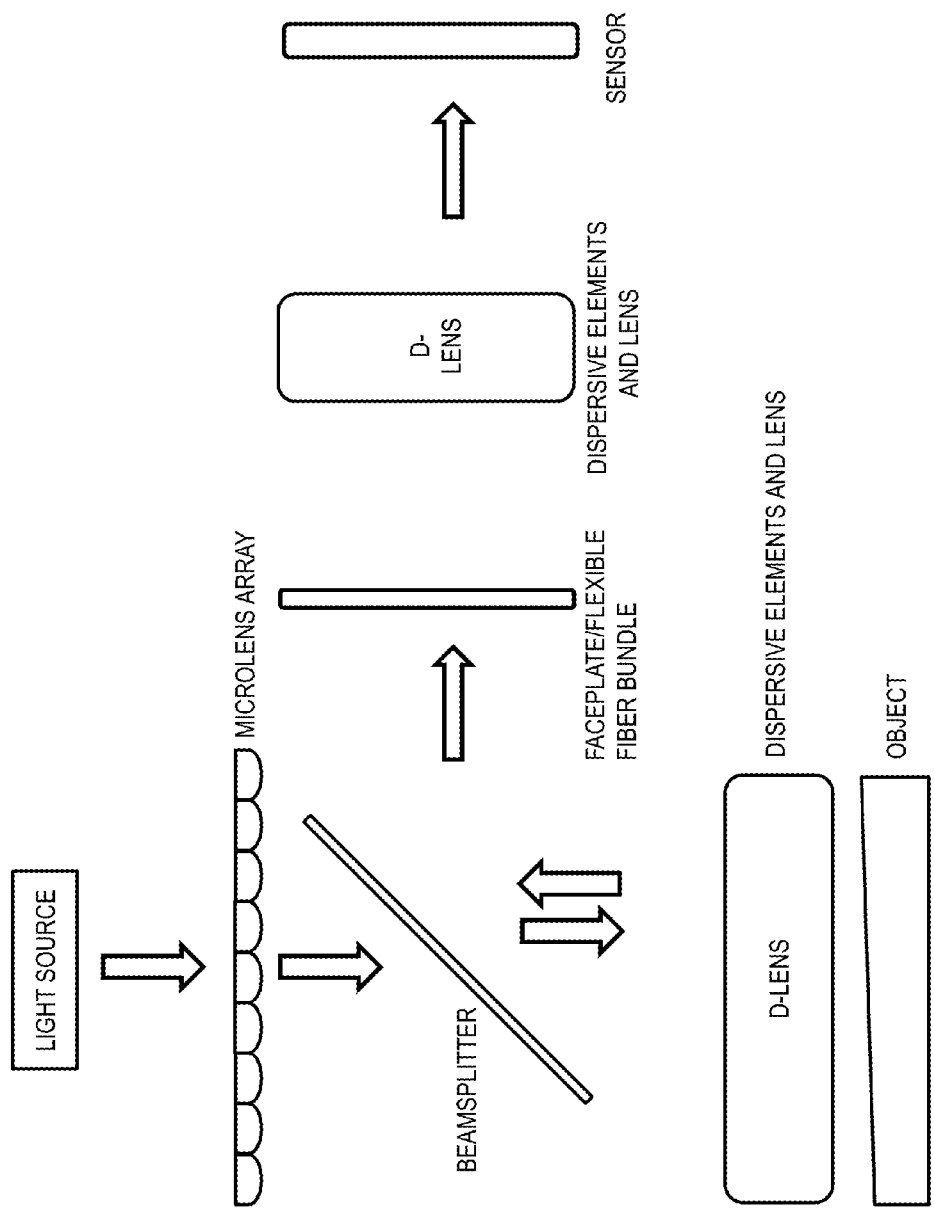
FIG. 10 is a schematic diagram illustrating a still further exemplary embodiment of the spectral imaging system of the present invention.

FIG. 10 illustrates a confocal imaging system, in which pinhole arrays are not used; microlens array and faceplate/flexible fiber bundle partially function as pinholes. Faceplate/flexible fiber bundle also flattens the light field.

Figure 11:
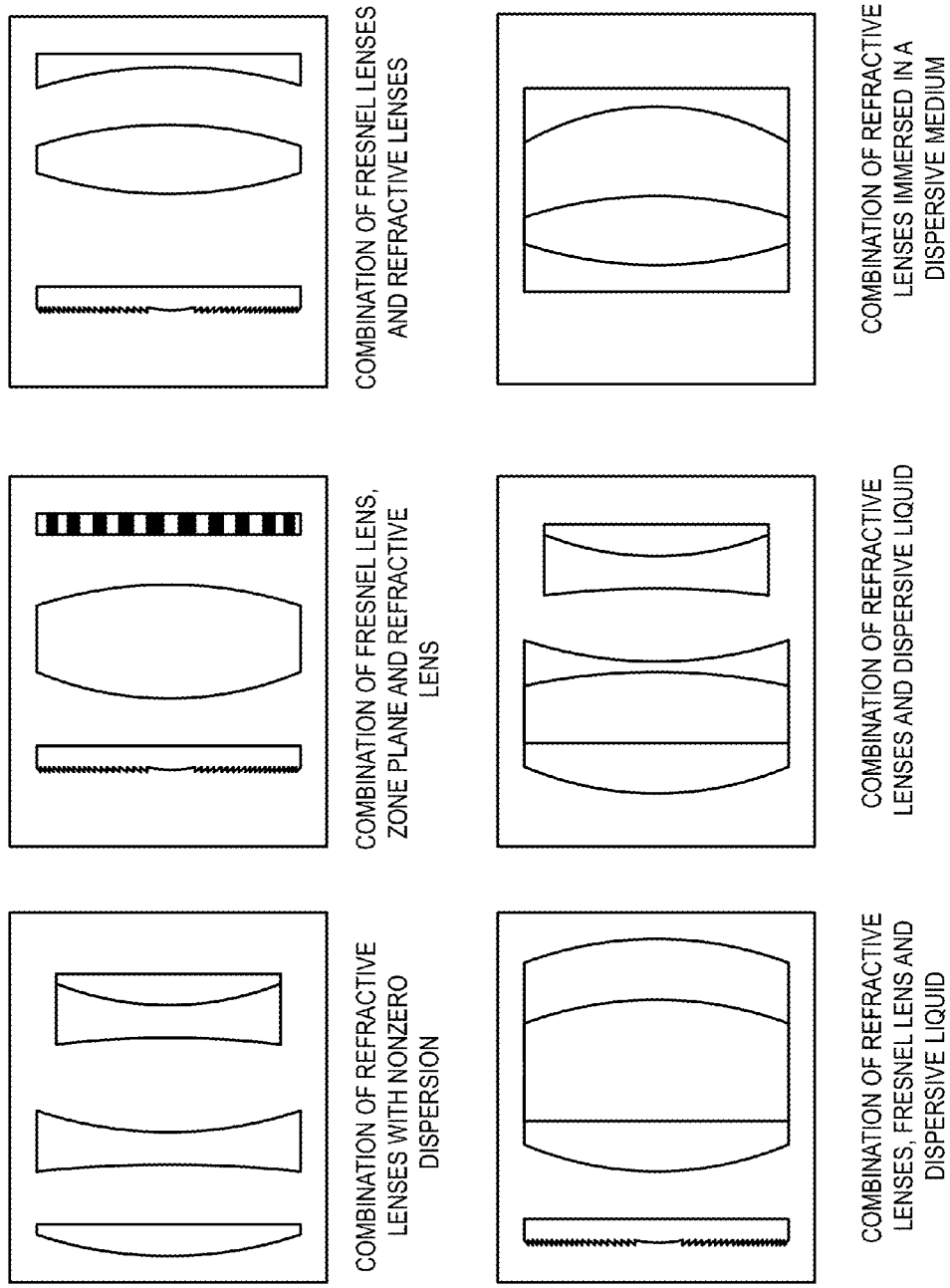
FIG. 11 is a series of schematic diagrams illustrating six (6) exemplary embodiments of the dispersive lens system of the spectral imaging system of the present invention.

FIG. 11 illustrates another implementation of confocal imaging system, in which pinhole arrays are not used; microlens array and faceplate/flexible fiber bundle partially function as pinholes. Faceplate/flexible fiber bundle also flattens the light field. A D-lens and sensor array function as spectral imaging system to separate different wavelength of the reflected/back scattered light from the object.

Simulations were performed in order to verify the feasibility of the proposed camera structure and technique for spectral imaging. The dispersive material used was a liquid with $n_F=1.6617(\lambda_1=486$ nm), $n_D=1.6400(\lambda_2=589$ nm), and $n_C=1.6320(\lambda_3=656$ nm). In the simulations, the change of focal length of a lens system with a dispersive material involved as a material between lenses and/or as the material of the lens was evaluated. In the first simulation, the lens system consisted of two convex-concave lenses with radii of 4 mm (convex) and 6 mm (concave) with thicknesses of 2.9 mm; separated by 1 mm with the dispersive liquid. Table 1 shows the focal lengths of the D-lens at wavelengths $\lambda_1=486$ nm, $\lambda_2=589$ nm, and $\lambda_3=656$ nm. The focal length was calculated based on the smallest spot size. As seen in the table, the separation between the focal length of the shortest and longest wavelengths is about 0.13 mm. The assumption here is that the light source is collimated.

TABLE 1

Focal length and spot size for a D-lens consisting of two convex-concave lenses with radii of 4 mm (convex) and 6 mm (concave) with thicknesses of 2.9 mm; separated 1 mm with a dispersive liquid with $n_F = 1.6617$, $n_D = 1.6400$, and $n_C = 1.6320$

| Wavelength (nm) | Field Diameter (mm) | Refractive Index | Focal Length (mm) | Spot Size (RMS) (μm) | Spot Size (GEO) (μm) |
|---|---|---|---|---|---|
| 486 | 1 | $n_F = 1.6617$ | 1.65 | 0.504 | 0.911 |
| 589 | 1 | $n_D = 1.6400$ | 1.74 | 0.505 | 0.914 |
| 656 | 1 | $n_C = 1.6320$ | 1.78 | 0.506 | 0.915 |

The next simulation was for a D-lens optical system that consisted of two bi-convex lenses with diameters of 4 mm and a radius of curvature of 4 mm and a thickness of 2.9 mm separated by 5 mm and the gap was filled with dispersive liquid. Table 2 shows the focal lengths and corresponding spot sizes at different wavelengths. For this configuration, the difference between focal length of shortest and longest wavelengths was about 0.13 mm.

TABLE 2

Focal length and spot size for a D-lens consisting of two bi-convex lenses with diameter of 4 mm and radius of curvature of 4 mm and thickness of 2.9 mm separated by 5 mm and the gap is filled with dispersive liquid with $n_F = 1.6617$, $n_D = 1.6400$, and $n_C = 1.6320$

| Wavelength (nm) | Field Diameter (mm) | Refractive Index | Focal Length (mm) | Spot Size (RMS) (μm) | Spot Size (GEO) (μm) |
|---|---|---|---|---|---|
| 486 | 1 | $n_F = 1.6617$ | 2.14 | 0.179 | 0.322 |
| 589 | 1 | $n_D = 1.6400$ | 2.00 | 0.192 | 0.374 |
| 656 | 1 | $n_C = 1.6320$ | 1.96 | 0.197 | 0.356 |

For third simulation, a Fresnel lens was used as a dispersive element. The Fresnel lens had a radial height of 3 mm, radius of 11.15 mm, and thickness of 1.5 mm. Table 3 shows the focal length for different wavelengths. The focal length difference between the shortest and longest wavelength was about 0.33 mm. Again, here it was assumed that the light source is collimated.

TABLE 3

Focal length and spot size for a D-lens consisting of a Fresnel lens made from the same material as dispersive liquid with $n_F = 1.6617$, $n_D = 1.6400$, and $n_C = 1.6320$. Fresnel lens had a radial height of 3 mm, radius of 11.15 mm, and thickness of 1.5 mm

| Wavelength (nm) | Field Diameter (mm) | Refractive Index | Focal Length (mm) | Spot Size (RMS) (μm) | Spot Size (GEO) (μm) |
|---|---|---|---|---|---|
| 486 | 1 | $n_F = 1.6617$ | 1.83 | 0.13 | 0.178 |
| 589 | 1 | $n_D = 1.6400$ | 2.06 | 0.129 | 0.178 |
| 656 | 1 | $n_C = 1.6320$ | 2.16 | 0.129 | 0.177 |

The last simulation was for a two microlens arrays with 0.1 mm thickness, 1 mm radius of curvature, and 0.4 mm height. The gap between two microlenses was 2 mm, which was filled with dispersive liquid. A plano-concave lens was put 1 mm in front of the microlenses. Table 4 shows the focal length at different wavelengths and their corresponding spot sizes. Note that the plano-concave lenses made collimated light diverge and therefore made the difference between the focal length of shortest and longest wavelengths about 57 mm.

TABLE 4

Focal length and spot size for a D-lens consisting of 2 microlens array with 0.1 mm thickness, 1 mm radius of curvature, and 0.4 mm height. The gap between the two microlenses is 2 mm and is filled with a dispersive liquid. A plano-concave lens is put 1 mm in front of the microlenses

| Wavelength (nm) | Field Diameter (mm) | Refractive Index | Focal Length (mm) | Spot Size (RMS) (μm) for different wavelength | | | Spot Size (GEO) (μm) for different wavelength | | |
|---|---|---|---|---|---|---|---|---|---|
| | | | | 486 | 589 | 656 | 486 | 589 | 656 |
| 486 | 10 | $n_F = 1.6617$ | 132.13 | 0.528 | 11.26 | 16.73 | 0.596 | 14.03 | 20.82 |
| 589 | 10 | $n_D = 1.6400$ | 166.55 | 15.43 | 0.667 | 6.19 | 19.1 | 0.751 | 7.76 |
| 656 | 10 | $n_C = 1.6320$ | 189.25 | 25.28 | 8.52 | 0.759 | 31.31 | 10.51 | 0.856 |

An experiment was conducted to validate the simulation results. A D-lens was made by piercing the middle of an objective lens and filling that part with dispersive liquid. Then, two different lasers (green and red HeNe lasers) were used to measure the image plane distance where the spot size was minimum; the minimum spot size occurred roughly at 10 cm and 11 m from the D-lens for the red laser and the green laser, respectively. Therefore, the D-lens showed good dispersion properties.

Figure 7:
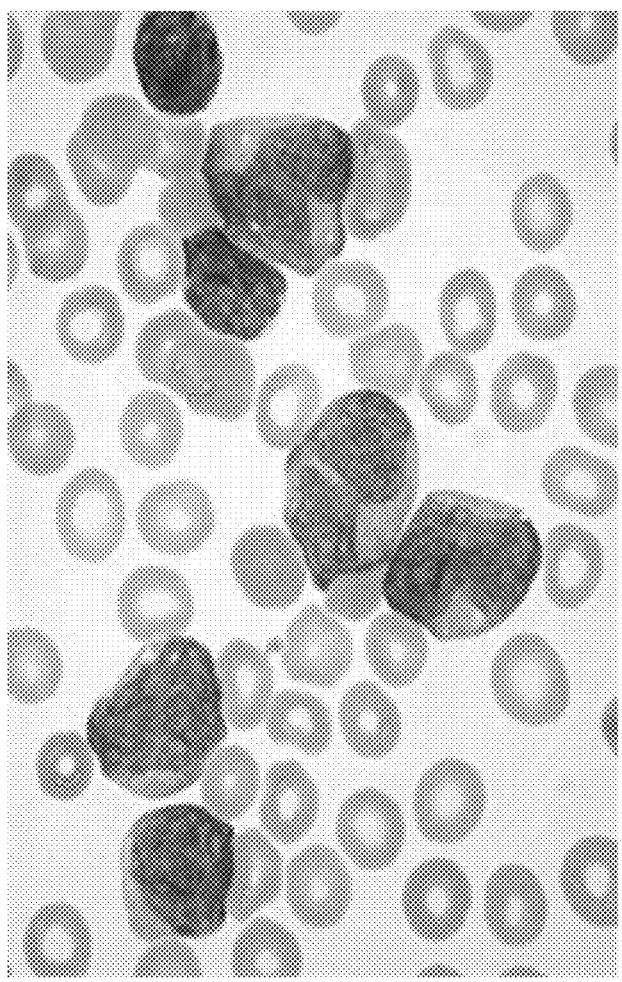
FIG. 7 is a photograph illustrating a microscope application of the present invention in which a smear contains cells of different types with different spectral contents.
Figure 8:
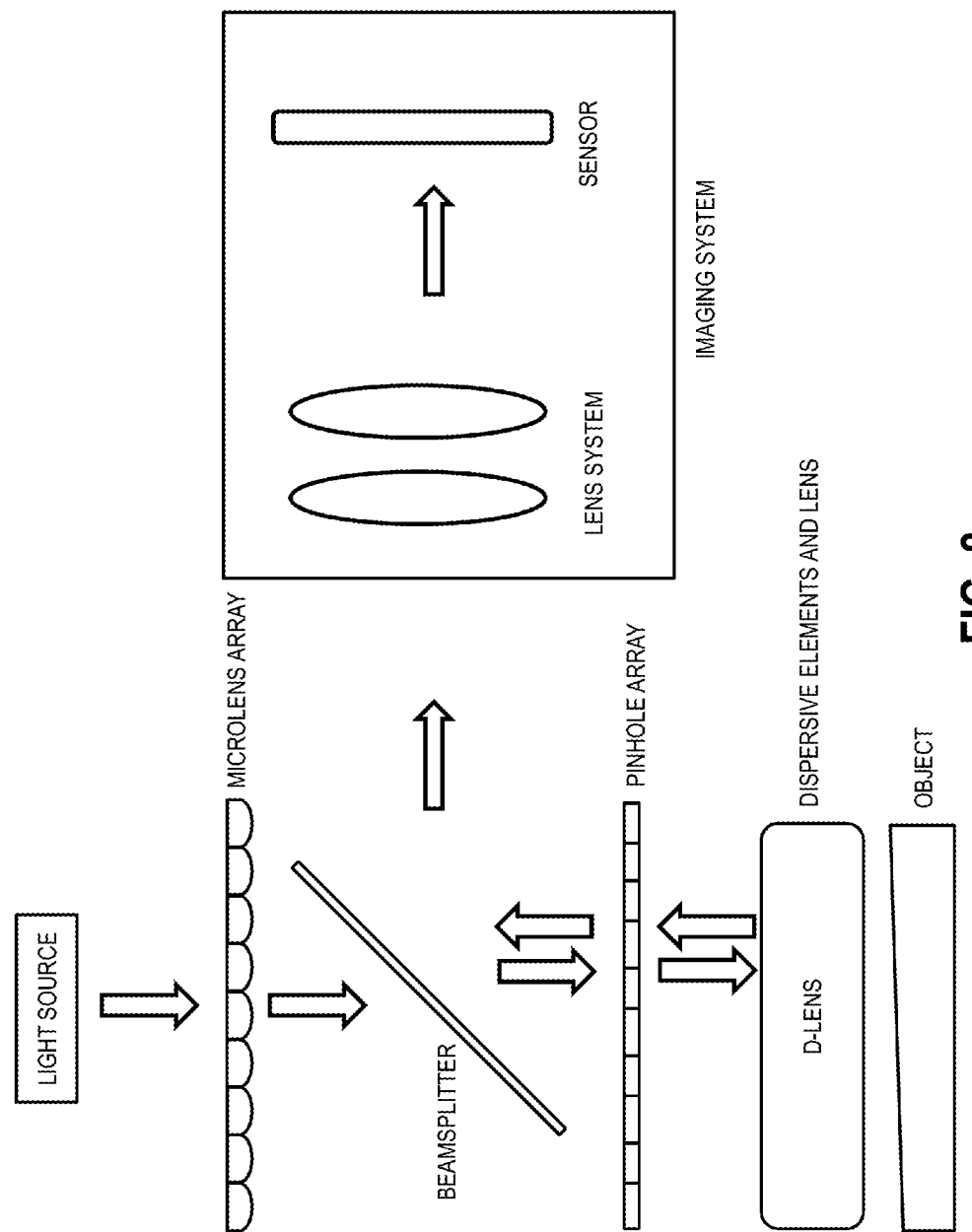
FIG. 8 is a schematic diagram illustrating a still further exemplary embodiment of the spectral imaging system of the present invention.

Another implementation of the spectral imaging system using a D-lens is in microscopy. In this case, a regular Light Field Camera or a DFD or a DFF may be used in a microscope. However, one could use a D-lens objective similar to the one described herein above as an objective of the microscope itself. In this system, the wavelength-to-depth conversion occurs at the microscope objective and not at the camera. Such a microscope could easily create multiple images of different colors from a single plane object. For example, an aspirate smear of some sample cells could be used as an object. As it is shown in FIG. 7, this smear contains cells of different types with different spectral contents. The proposed microscope is able to separate the cells according to their colors (i.e. spectral information) and therefore, sort the cells, and cell counting is much easier.

The proposed technique can be used to recover both topography and spectral content of an object/scene. One way to do this is to first use the imaging system with conventional lens and using the depth measurement techniques to recover the topography of the object and then use the imaging system with a D-lens and using the depth measurement techniques to obtain the spectral content of the object/scene. It is also possible to do the measurement with two lenses with different dispersion properties in combination with a Light Field Camera or a DFD or a DFF technique.

The D-lens of the present disclosure can also be used in a confocal configuration (FIG. 9). Since the D-lens has different focal lengths for different wavelengths, by using a light source with a broad spectrum, a tunable laser source, or separate diode lasers at different wavelengths, each point of the object has a focused image at a specific wavelength. This wavelength depends on the profile (i.e. height) of the object at that specific point. The confocal configuration may consist of microlenses in order to image several points of the object at once, therefore, the confocal image may be obtained without any need to x-y scan. When the system light source is a while light or a broadband light source, a spectral imaging system is needed to separate different wavelengths which can be one of the spectral imaging systems explained above. When the light source is tunable laser source or diode lasers which are turned ON in sequence, spectral imaging system is not needed and a sensor array responsive to the corresponding wavelengths is sufficient. When the light source is combined of three red, green and blue wavelengths, the three wavelengths may be turned ON simultaneously and an RGB camera be used as sensor array. The confocal system can include a faceplate or a flexible fiber bundle (FIG. 10). Each fiber or a set of neighboring fibers acts as a pinhole.

Besides the confocal configuration, the system can include a light field configuration in order to simultaneously calculate both the spectral content and the profile of an object.

Other potential applications include, but are not limited to:
  Spectral imaging for forensic evidence detection (e.g. blood detection)
  Spectral imaging for biological measurement (i.e. wherever a biological entity has a spectral signature)
  Spectral imaging for remote sensing applications
  Spectral imaging for height measurement FIG. 11 is a series of schematic diagrams illustrating six (6) exemplary embodiments of the dispersive lens system of the spectral imaging system of the present invention. The implementation of the dispersive lens system includes a combination of refractive lenses with dispersion, a combination of Fresnel lenses, a zone plate and refractive lenses, a combination of Fresnel lenses and refractive lenses, a combination of refractive lenses, a Fresnel lens and a dispersive liquid, a combination of refractive lenses and a dispersive liquid, and a combination of refractive lenses immersed in a dispersive medium, for example.

The essence of getting spectral imaging using dispersion property is to change one or more parameters of the imaging system that changes the output image completely or partially as a result of dispersion property of imaging system and by the knowledge of how this parameter changes the intensity distribution of different images at different wavelengths, which are the slices of spectral images, the spectral image at each wavelength can be calculated, collectively.

Figure 12:
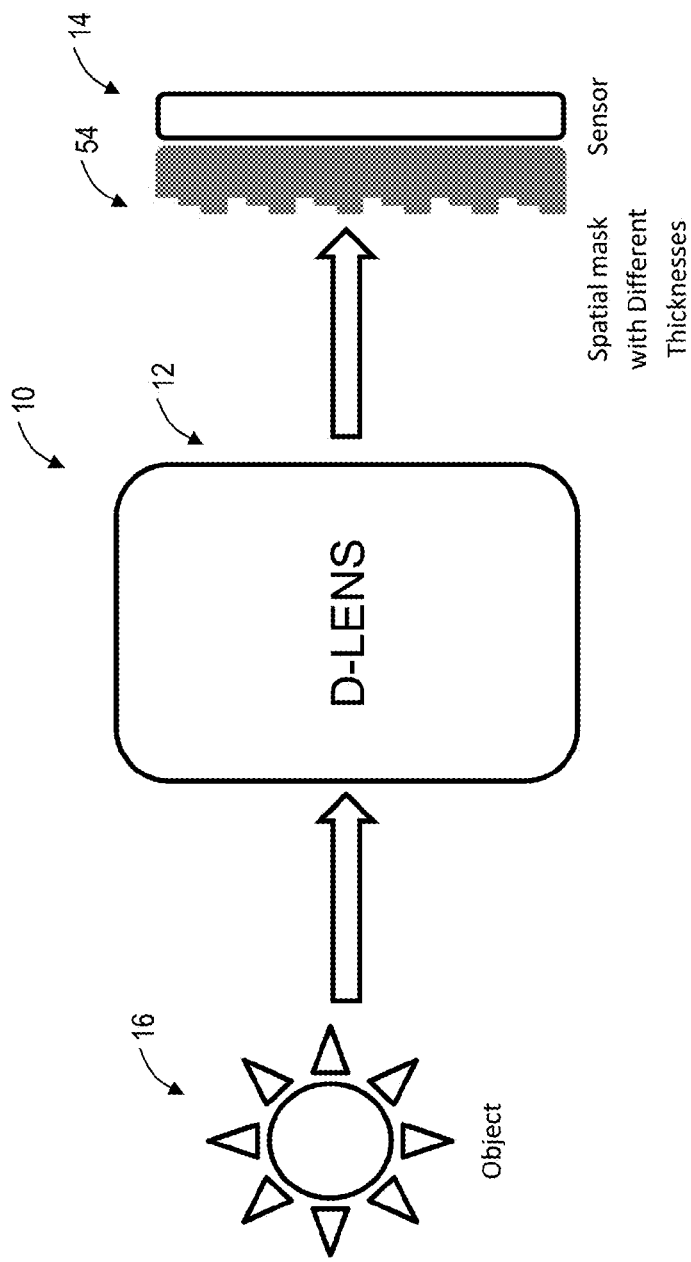
FIG. 12 is a schematic diagram illustrating a further exemplary embodiment of the spectral imaging system of the present invention using a spatial mask.

One parameter of the imaging system is the optical distance between the lens system and the image. This parameter can be changed by making a spatial mask with transparent material with refractive index of n that has a specific thickness for each pixel (or set of pixels), which effectively changes the optical distance (FIG. 12). The use of the spatial mask will reduce or eliminate the need for a moving part since the purpose of moving part is to change the optical distance between lens system and image plane and/or lens system and object plane and/or object plane and image plane, or lenses themselves. Therefore the spatial mask enables us to have images with different parameters (e.g. different distances from the lens system) in one shot.

Since there are multiple images in one shot, the subset of pixels of the image, comprised of pixels with the same parameter of imaging system (e.g. pixels with same distance from the lens system) comprise one image with a specific parameter. This image can be interpolated to increase the resolution of the image (e.g. the same resolution of the sensor).

The spatial mask can be coated with antireflection coating in back side and/or front side.

The spatial mask can be combined with a set of lens array or a microlens array. Combining the spatial mask with a microlens array can result in decreasing the thickness of the spatial mask. If the lenses in microlens array have different parameters and/or positioned at different planes, the combination with spatial mask can decrease the thickness of spatial mask further and/or eliminate/decrease further the need for moving part.

Figure 13:
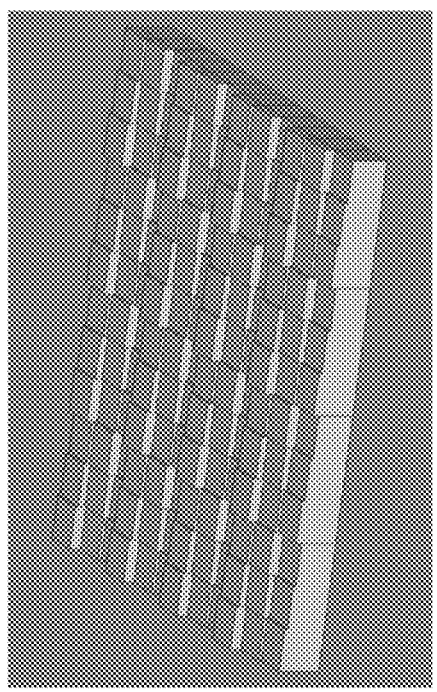
FIG. 13 is a schematic diagram illustrating one exemplary embodiment of the spatial mask of FIG. 12.

For each block of M×N pixels, we, therefore, use a spatial mask in front of sensor in which for each pixel (or group of pixels) in the block, the optical distance between the lens system and the sensor is different. For example, the spatial mask can be made of similar blocks of 3×3 pixels in which each pixel in a 3×3-pixel block has different thickness (FIG. 13); therefore the spatial mask has 3×3=9 different optical distances in each block of 3×3 pixels.

Since the aberration (e.g. spherical aberration) can be compensated using spatial filters, the spatial mask explained above can be designed to compensate (completely or partially) for one or more aberrations, too. Therefore, for example, the spatial mask can be designed to make 9 different optical distances at each block of 3×3 pixels and at the same time compensate for a specific amount of spherical aberration and/or coma aberration.

The spatial mask can be either planar mask or a curved mask; i.e. it can be made over a curved surface. The material for the spatial mask could be a high index material to decrease the physical height of the mask.

Each block of pixels in spatial mask is not necessary to be repeated in the spatial mask with the exact configuration. For example for one block of pixels the shortest pixel can be positioned at the corner, while for the neighboring block the shortest pixel can be positioned at the center of the block. As another example, the position of the pixels in the block can be determined by the way that the spatial mask has circular symmetry.

The spatial mask can also integrated onto the faceplate; i.e. the thickness of faceplate at different positions will be different in a way that the optical distance for the corresponding pixel will be different such that its effect is as to use the spatial mask explained above. The same way that it was explained above, the change of thickness for faceplate in can also designed to compensate for aberration (e.g. spherical aberration), too.

By knowing the parameters of the imaging system (e.g. relative lens system position, object plane and image plane positions, and lens system characteristic functions), the aberrations including spherical and coma aberrations can be calculated. This calculation may use a series of calibration images from predefined objects and system parameters. The aberration can be compensated (completely or partially), then, in hardware using special filters and/or in software.

By knowing the parameters of the system and sufficient amount of images taken with different parameters, the spectral image can be calculated by solving a set of equations. For example, assume that the image has L=M×N pixels and P is the number of wavelength bands that spectral images are required to be calculated. Therefore the number of variables is $N_v$=M×N×P. By knowing the parameters of the system, for each acquired image, we have L=M×N equations. By taking P images with different parameters and assuming that the equations derived from images are independent, the spectral images can be calculated.

To increase the accuracy, the number of acquired images can be increased and the error be minimized using, for example, minimum mean square estimation to calculate the spectral images.

Since the images are compressible in both spatial and spectral domains, the number of acquired images can be less than P images and the spectral images can be calculated using optimization techniques.

A mask with two or more opening can be used in front of object plane to divide the object into different sections. Then the image of each section is processed separately and, at the end, they are combined to compose the whole spectral image. To cover the entire area of the object the mask or the openings of the mask should be moved.

The partitioning can be done at the image plane. The image can be divided into different sections and each section is processed separately and, at the end, they are combined to compose the whole spectral image.

All the above mentioned configurations for selective wavelength imaging systems have a matrix sensor. When one dimension of the matrix sensor is equal to one; the sensor will be a line array and the imaging system will be referred as selective wavelength line imaging system. Line array also refers to a sensor matrix where the number of sensors in a dimension is much larger than the other dimension.

There are many different techniques for spectral imaging. In one category the spectral images are scanned point by point or line by line (spatial scanning) Each point/line is connected to a spectrometer or an array of spectrometers to extract the spectral information of the corresponding point/line. Therefore the whole data cube of the spectral image data is captured. Examples of this technique include pushbroom imaging spectrometer and whiskbroom imaging spectrometer. Another type of spectral imaging system uses wavelength scanning techniques. In this technique, there is filter for each specific wavelength band and the images at each wavelength are captured using the corresponding filter or the scene is illuminated with light with different wavelengths. An example of this type of spectral imaging system is a tunable filter spectral imaging system. The third type of spectral imaging system captures the data cube spectral images at once. The examples of this technique are computed tomography imaging spectrometry (CTIS) and coded aperture snapshot spectral imager (CASSI). In CTIS, a diffractive element like grating is used to image difference wavelength content of the image at different angles. In CASSI, the same concept is combined with compressive imaging technique in order to acquire less data than other techniques while computing the same datacube.

The present technique is different from the first technique (spatial scanning) in the way that it is not scanning spatially and the spectrum of all points of the image are captured at once. The present technique is different from the second technique (wavelength scanning) in the way that it does not use filters or narrowband illumination to discriminate between every single wavelength. Instead, a dispersive element (D-lens) does separate the wavelengths spatially. The present technique is different from computed tomography imaging spectrometry (CTIS) in the way that our technique uses a dispersive element that separate wavelengths in different distance other than separating in different angles. In addition the D-lens also images the object, too (it contributes to the total imaging system, e.g. it changes the focal lengths for different wavelength) while the diffractive element in CTIS is only responsible for changing the direction of light for each wavelength and does not have any role in imaging. The present technique is different from coded aperture snapshot spectral imager (CASSI) the same way that it is different from CTIS. Our technique uses a dispersive element that separate wavelength in different distance other than separating in different angles. In addition the D-lens also images the object, too (it contributes to the total imaging system, e.g. it changes the focal lengths for different wavelength) while the diffractive element in CASSI only is responsible for changing the direction of light for each wavelength and does not have role in imaging.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims.

What is claimed is:

1. A spectral imaging system, comprising:
   a dispersive element operable for capturing a single image of an object and separating wavelengths associated with the image of the object by distance perpendicular to the image; and
   a sensor operable for determining a given wavelength from the separated wavelengths using the distance;
   wherein the dispersive element is disposed at a distance from the object;
   wherein the sensor captures data from the image in two spatial dimensions and a spectral dimension perpendicular to the two spatial dimensions; and
   wherein the data in the two spatial dimensions is captured from the image simultaneously.

2. The spectral imaging system of claim 1, wherein the dispersive element comprises a lens and a dispersive medium.

3. The spectral imaging system of claim 2, wherein the dispersive medium comprises a dispersive lens.

4. The spectral imaging system of claim 1, wherein the dispersive element comprises a plurality of lenses separated by a dispersive medium.

5. The spectral imaging system of claim 1, further comprising one of a camera and a light field camera.

6. The spectral imaging system of claim 1, further comprising an imaging system.

7. The spectral imaging system of claim 1, further comprising a confocal system.

8. The spectral imaging system of claim 1, further comprising a microlens array.

9. The spectral imaging system of claim 1, further comprising a lens array having varying focal lengths.

10. The spectral imaging system of claim 1, further comprising a lens array having varying displacements with respect to a lens array plane.

11. The spectral imaging system of claim 1, further comprising a lens and one or more beamsplitters operable for dividing a beam from the lens into a plurality of beams.

12. The spectral imaging system of claim 1, further comprising one or more filters operable for separating wavelengths.

13. The spectral imaging system of claim 1, further comprising a profilometry algorithm operable for acquiring both depth and spectral information.

\* \* \* \* \*